Jan. 20, 1970   M. G. HOFFMAN   3,490,748
FRAGMENTATION BRAKE FOR TURBINES
Filed May 14, 1968
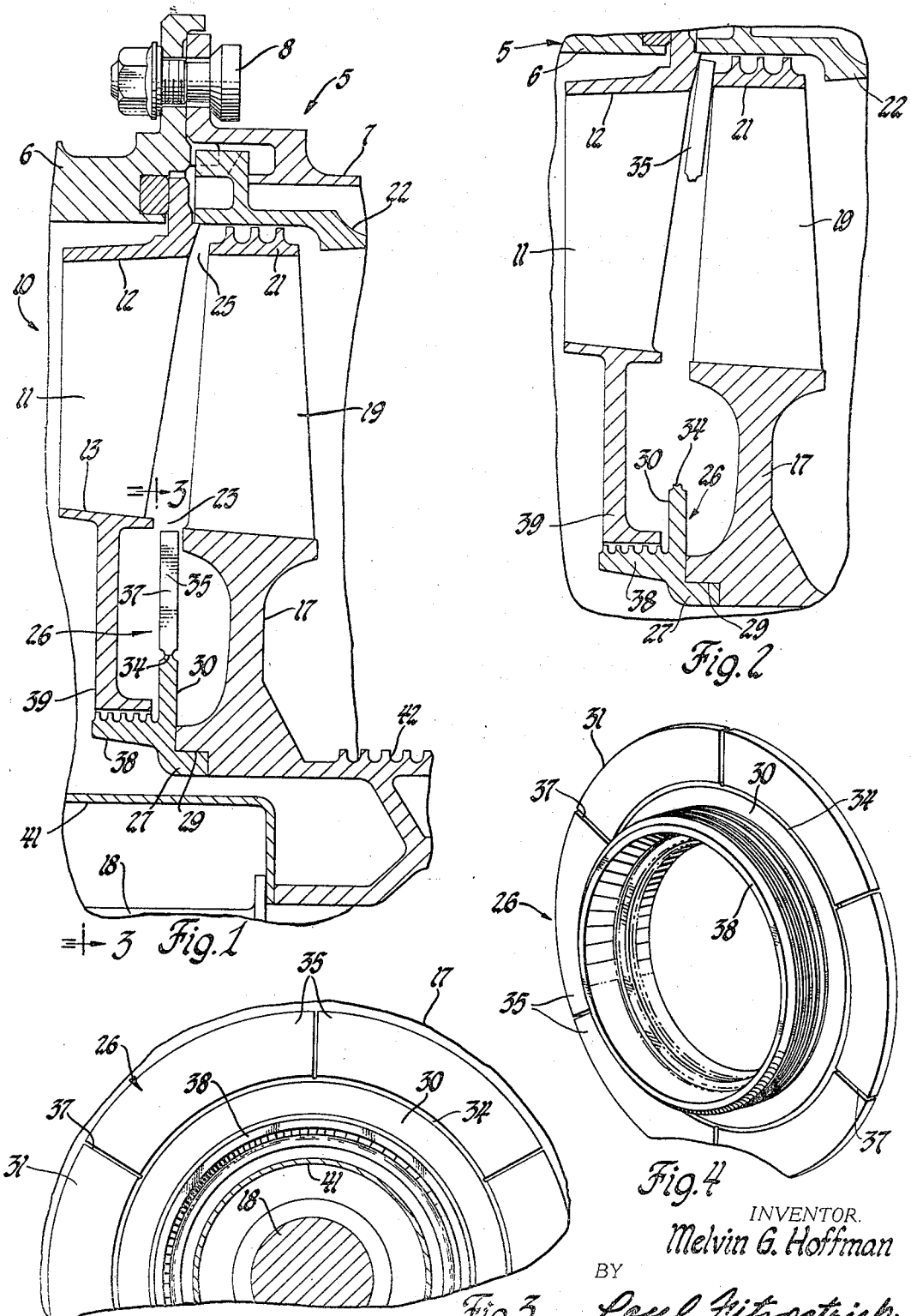
INVENTOR.
Melvin G. Hoffman
BY
Paul Fitzpatrick
ATTORNEY United States Patent Office 3,490,748
Patented Jan. 20, 1970

3,490,748
FRAGMENTATION BRAKE FOR TURBINES
Melvin G. Hoffman, Speedway, Ind., assignor to General Motors Corporation, Detroit, Mich., a corporation of Delaware
Filed May 14, 1968, Ser. No. 729,112
Int. Cl. F01d 17/00, 7/00, 21/00
U.S. Cl. 415—9                                    9 Claims

ABSTRACT OF THE DISCLOSURE

An axial-flow turbine includes a disk, mounted axially between the stator and rotor, which is scored and slotted so that it bursts in response to centrifugal force at a rotational speed of the turbine in excess of any normal speed but below the speed at which the turbine rotor wheel will fracture. Upon breaking of the disk, the fragments fly outward and lodge between the rotor and stator, bringing the turbine to a halt.

---

The invention herein described was made in the course of work under a contract or subcontract thereunder with the Department of Defense.

My invention relates to turbines and related machinery, and particularly to structure for preventing machines which may radically overspeed and destroy themselves upon release of the driven load from so overspeeding.

It is well known that most turbines are capable of attaining a very high degree of overspeed in a very short time upon loss of the load which normally restrains the speed of the turbine. Many types of centrifugal force responsive devices which are effective to energize brakes, by-pass the turbine, or cut off the supply of motive fluid to the turbine, have been proposed to prevent the turbine reaching a speed at which the wheel may burst and destroy the turbine as well, perhaps, as project fragments of the turbine into the surrounding environment.

The principal objects of my invention are to provide a very simple and reliable device for preventing destructive overspeed of turbines, which may readily be incorporated in turbines and such machines, and which will serve to jam the rotor or break off the blades upon overspeed below the point at which the rotor wheel will fracture.

The problem of turbine overspeed has long been known and the prior art discloses various proposals for speed responsive devices, some of a self-destructive nature, to prevent such overspeed of turbines as might cause the turbine wheel or disk to shatter.

Examples of such are the following U.S. patents: Allingham No. 2,962,257 for Turbine Overspeed Control, Nov. 29, 1960; Chandler No. 3,051,440 for Air Driven Turbines, Aug. 28, 1962; De Muth No. 3,164,370 for Radial-Flow Turbine Safety, Jan. 5, 1965; and Canadian Patent No. 624,166 of Flanagan et al. for Controlled Turbine Wheel Failure, July 18, 1961.

The nature of my invention and the advantages thereof will be apparent to those skilled in the art from the succeeding detailed description of the preferred embodiment of the invention and the accompanying drawings thereof.

FIGURE 1 is a partial sectional view of a gas turbine taken on a plane containing the axis of rotation of the rotor.

FIGURE 2 is a similar view of a portion of FIGURE 1 illustrating the fragmentation of the burst disk.

FIGURE 3 is a sectional view taken on the plane indicated by the line 3—3 in FIGURE 1.

FIGURE 4 is an axonometric view of the burst disk structure.

Referring to the drawings, FIGURE 1 shows enough of the structure of a gas turbine engine of known type to illustrate the environment and operation of my invention. Such a turbine may have an outer case 5 including sections 6 and 7 held together by bolts 8. A turbine nozzle ring 10 mounted in the case includes vanes 11 extending between an outer shroud 12 and an inner shroud 13. A turbine wheel 17 is mounted on a shaft 18 which is rotatably supported by any suitable means (not illustrated). The wheel 17 mounts a row of turbine blades 19 which may have an outer rotating shroud 21. The turbine wheel may rotate within a fixed shroud 22.

The turbine case, nozzle, and shroud 22 are portions of the stator of the turbine and the turbine wheel, blades, and rotating shroud 21 are portions of the rotor. Motive fluid from a suitable source (not illustrated) flows through the nozzle 10 and impinges upon the blades 19. There is an axial gap at 23 between the stator and rotor at the inner boundary of the motive fluid path and a gap at 25 at the outer boundary of the motive fluid path.

According to my invention, a burst disk 26 is provided which rotates with the turbine and which is adapted to fragment upon overspeed and lodge in a gap such as 23 or 25 to jam the turbine or strip the rotor blades and thus stop its rotation. Preferably, the structure of the burst disk 26 includes a pilot 27 which is a press fit in a counterbore 29 in the face of the turbine wheel. As shown clearly in FIGURES 3 and 4, the burst disk 26 includes a radially inner portion 30 which is annular and a radially outer portion 31 which is connected to the inner portion 30 by a weak section 34 defined by grooves machined preferably into both faces of the burst disk. Other weak section arrangements can, of course, be used. The outer portion 31 of the burst disk is divided into a number of segments 35, preferably six, by radial slots 37 which extend from the outer margin of the disk to the weakened section 34. Thus, the outer portion of the disk has no hoop strength and has limited disk strength because of the weakened fracture zone at 34 between the segments 35 and the inner portion 30.

The thickness of the weakened section 34 can be calculated to cause it to fracture due to the centrifugal force acting on the segments 35 at a speed higher than normal operating speed of the turbine but significantly lower than the speed at which the turbine wheel itself will burst. FIGURE 2 illustrates the condition in which the burst disk has parted at the weakened section 34 and shows a segment 35 which has moved outwardly under the influence of centrifugal force and lodged between the outer shroud 12 of the nozzle and the outer shroud 21 of the wheel, effectively jamming the machinery and stopping the turbine. Other segments would be expected to lodge in the same way. Particularly if the blades are unshrouded, they would be expected to break off, thus terminating the driving torque.

Mention may be made of other details in the drawing. Conveniently, the burst disk 30 includes an axial extension 38 which forms the inner member of a labyrinth seal cooperating with a diaphragm 39 extending inwardly from the turbine nozzle. Cylinder 41 mounted on shaft 18 forms part of another labyrinth seal (not illustrated). Wheel 17 bears the inner portion 42 of another labyrinth seal.

It will be seen that the structure described adds very little to the weight or complexity of the turbine, is readily incorporated in standard types of turbine structures, and is well adapted to terminate rotation of the turbine upon overspeed sufficient to burst the disk 26. The invention is applicable to turbines of various types including radial-flow turbines, and to other machines having relatively rotatable parts which may be jammed by fragments of a burst disk according to my invention.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. A rotary machine comprising, in combination, a stator, a rotor rotatable adjacent to the stator, and means for preventing hazardous overspeed of the rotor comprising a burst disk mounted on the rotor to rotate therewith, the burst disk being disposed axially between the said stator and rotor, the burst disk having a locally weakened structure configured to fragment at a speed above normal operating speed of the rotor but below the said hazardous overspeed, the fragments of the burst disk being adapted to jam between the stator and rotor and decelerate the machine.

2. A machine as recited in claim 1 in which the rotor and stator are bladed parts of a turbomachine.

3. A machine as recited in claim 2 in which the rotor includes a rotating blade shroud axially spaced from a portion of the stator and the disk fragments are adapted to jam between the said shroud and said portion.

4. A machine as recited in claim 1 in which the burst disk is formed with a circumferential weak zone radially inward from the outer margin thereof so that the portion of the burst disk outward from the weak zone is adapted to fly off upon predetermined overspeed.

5. A machine as recited in claim 4 in which the portion of the burst disk radially outward of the weak zone includes structure reducing the hoop strength thereof.

6. A machine as recited in claim 5 in which the said structure includes radially extending slots in the disk.

7. A machine as recited in claim 1 in which the burst disk comprises a radially inner portion and a radially outer portion and a weak zone connecting the said portions, the outer portion being radially slotted at points distributed around the circumference of the disk.

8. A machine as recited in claim 1 in which the burst disk includes a ring of sectors of an annulus with weakened zones between the sectors.

9. A machine as recited in claim 8 in which the weakened zones are slots in the disk.

References Cited

UNITED STATES PATENTS

| | | |
|---|---|---|
| 2,966,333 | 12/1960 | Flanagan. |
| 3,158,999 | 12/1964 | Carriere et al. ____ 188—185 X |
| 3,271,005 | 9/1966 | Jones. |

FOREIGN PATENTS

| | | |
|---|---|---|
| 492,820 | 5/1953 | Canada. |
| 624,166 | 7/1961 | Canada. |

EVERETTE A. POWELL, Jr., Primary Examiner

U.S. Cl. X.R.

188—185; 253—77